(12) United States Patent
Raju (10) Patent No.: US 11,341,089 B2
(45) Date of Patent: May 24, 2022

(54) SELF-OPTIMIZING INTERVAL DETECTION DATA STRUCTURE

(71) Applicant: EMC IP Holding Company LLC, Hopkinton, MA (US)

(72) Inventor: Suraj Raju, Issaquah, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 701 days.

(21) Appl. No.: 16/219,048

(22) Filed: Dec. 13, 2018

(65) Prior Publication Data
US 2020/0192864 A1 Jun. 18, 2020

(51) Int. Cl.
| | |
|---|---|
| G06F 3/00 | (2006.01) |
| G06F 16/11 | (2019.01) |
| G06F 16/176 | (2019.01) |
| G06F 16/182 | (2019.01) |
| G06F 3/06 | (2006.01) |
| G06F 11/30 | (2006.01) |
| G06F 11/34 | (2006.01) |

(52) U.S. Cl.
CPC .......... *G06F 16/119* (2019.01); *G06F 3/067* (2013.01); *G06F 3/0611* (2013.01); *G06F 3/0647* (2013.01); *G06F 11/3034* (2013.01); *G06F 11/3433* (2013.01); *G06F 16/1774* (2019.01); *G06F 16/1824* (2019.01); *G06F 2201/81* (2013.01)

(58) Field of Classification Search
None
See application file for complete search history.

(56) References Cited

U.S. PATENT DOCUMENTS

| | | | | |
|---|---|---|---|---|
| 2008/0176577 A1* | 7/2008 | Bourlas | ................... | H04L 5/023 455/454 |
| 2010/0332401 A1* | 12/2010 | Prahlad | ............... | H04L 63/0428 705/80 |

OTHER PUBLICATIONS

Li et al. 2015. A Flexible QoS Fortified Distributed Key-Value STorage System for the Cloud. IEEE International Conference on Big Data. pp. 515-522. 2015.*

\* cited by examiner

*Primary Examiner* — Tuankhanh D Phan
(74) *Attorney, Agent, or Firm* — Amin, Turocy & Watson, LLP (57) ABSTRACT

A self-optimizing interval detection data structure is provided herein. A data storage system as described herein can include a memory that stores computer executable components and a processor that executes computer executable components stored in the memory. The computer executable components can include a candidate assignment component that maps properties of a resource of the data storage system to respective candidate data structures; a latency estimation component that estimates respective latencies associated with the respective candidate data structures; and a selection component that selects a candidate data structure of the respective candidate data structures having a latency that is less than a threshold latency, resulting in a selected data structure.

20 Claims, 9 Drawing Sheets

SELF-OPTIMIZING INTERVAL DETECTION DATA STRUCTURE

TECHNICAL FIELD

The subject application is related to data storage systems, and more particularly, to techniques for improving performance of a data storage system.

BACKGROUND

As computing technology has advanced over time, so too has the amount and scope of data that can be maintained and analyzed via computer systems. For instance, the ability to manage very large data sets, commonly known as big data, has led to significant advances in fields such as manufacturing, media, science, and e-commerce, among many others. Data storage systems, such as those utilized in network-attached storage (NAS) platforms, provide the means by which these large sets of data can be maintained in an efficient and reliable way. To facilitate system efficiency and scalability, an NAS platform can utilize a distributed system in which storage and/or computing resources are distributed among multiple computing nodes, which in turn can be arranged into computing clusters. Additionally, an NAS platform can be designed as a single-space storage solution, in which data are stored on the platform via a single volume and a single file system, thereby granting a client connected to any computing node of the platform the ability to access all data stored on the platform.

Since a large number of clients can be connected to a data storage system at any given time, an NAS platform can include mechanisms to regulate access to stored resources. For instance, an NAS platform can include a locking mechanism to give one or more clients exclusive permission to modify files or other resources stored on the platform in order to prevent inconsistencies in those resources across the platform due to simultaneous modifications.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system includes a memory that stores computer executable components and a processor that executes computer executable components stored in the memory. The computer executable components can include a candidate assignment component that maps properties of a resource of the data storage system to respective candidate data structures, a latency estimation component that estimates respective latencies associated with the respective candidate data structures, and a selection component that selects a candidate data structure of the respective candidate data structures having a latency that is less than a threshold latency, resulting in a selected data structure.

In another aspect, a method is described herein. The method can include mapping, by a device operatively coupled to a processor, properties of a resource of a data storage system to candidate data structures, estimating, by the device, respective latencies associated with respective ones of the candidate data structures, and selecting, by the device, a candidate data structure of the candidate data structures having a latency of the respective latencies that is less than a threshold latency, resulting in a selected data structure.

In an additional aspect, a machine-readable medium including computer executable instructions is described herein. The instructions, when executed by a processor of a data storage system, can facilitate performance of operations including mapping properties of a resource of the data storage system to a plurality of candidate data structures, estimating respective latencies associated with respective ones of the plurality of candidate data structures, and selecting a candidate data structure of the plurality of candidate data structures having a latency of the respective latencies that is less than a threshold latency, resulting in a selected data structure.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a network-attached storage (NAS) platform can serve as a storage environment for various types of data, which can provide a functionally unlimited amount of storage space for multiple users via a seamless single volume and a single file system. To facilitate management of and access to large-scale data sets, an NAS platform can utilize a distributed computing system that includes multiple computing devices (nodes) that are physically and/or logically connected into clusters. Respective nodes in a NAS cluster can further be configured such that each node enables access (e.g., by a client) to all data stored on the platform.

In order to ensure the consistency of files and/or other resources stored by an NAS platform across multiple client connections, an NAS platform can coordinate locks on resources and/or portions of resources to prevent simultaneous conflicting modifications to a stored resource. In an aspect, this can be accomplished through the use of a coordinated lock manager, which can include respective lock initiator and lock coordinator modules at respective cluster nodes of the NAS platform. Techniques by which a lock manager can operate are described in further detail below.

In an aspect, when a lock request for a given resource and range is submitted to a node of the platform, a lock manager associated with that node can determine whether the lock request can be satisfied. For instance, the lock manager can consult an interval tree or other suitable data structure that tracks ranges within the resource in order to determine any existing lock owners with ranges that intersect the requested range, any lock waiters with ranges that intersect the requested range, or the like. Similarly, when a lock is released, a batched lock grant is processed, and/or upon other conditions, the lock manager can determine which lock waiters can be satisfied (e.g., granted their requested locks) at that time. In such an instance, for each waiter, the lock manager can check that there are no lock owners with ranges intersecting the given range, that there are no other waiters with ranges intersecting the given range, etc.

For a data structure that represents the entire resource associated with a given set of lock requests, both of the above operations can be performed by the lock manager in order $O(W \times W + W \times O)$, where W is the total number of waiters associated with the resource and O is the total number of lock owners associated with the resource. Thus, more generally, the above operations have a time complexity of $O(n^2)$. Because controlling access to stored resources has a direct impact on the speed and throughput of an associated NAS platform, it is desirable to lower the time complexity of these and/or other operations.

To the foregoing and/or related ends, various embodiments described herein provide techniques by which a data structure, such as a data structure used for lock management on a distributed data storage system, can be tailored to the properties of the system on which it is used. This, in turn, can lower the time complexity of operations such as those described above, e.g., from $O(n^2)$ to $O(\log n)$ in some cases. Various embodiments described herein can provide one or more advantages that can improve the functionality of an NAS system. A non-exhaustive list of such benefits is as follows. Power consumption, processing cycles, and/or other computing resources associated with traversing a data structure, such as a data structure for lock management, can be reduced. Latency in an NAS system associated with file access can be reduced. Network bandwidth usage between different nodes of an NAS system, or between a node of the NAS system and a client computer, can be reduced. File access speed in an NAS system can be increased. Other advantages that result in improvements to the operation of an NAS system are also possible.

Figure 1:
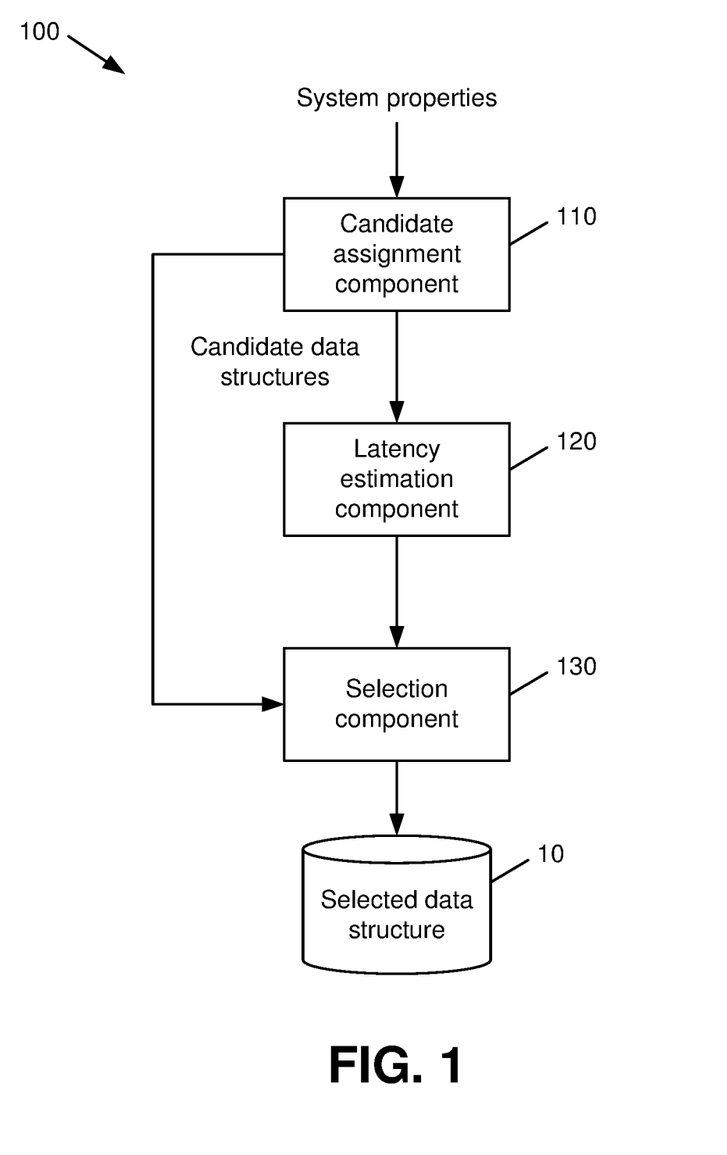
FIG. 1 is a block diagram of a system that facilitates initializing a self-optimizing interval detection data structure in accordance with various aspects described herein.

With reference now to the drawings, FIG. 1 illustrates a system 100 that facilitates initializing a self-optimizing interval detection data structure in accordance with various aspects described herein. As shown in FIG. 1, system 100 includes a candidate assignment component 110 that can map properties of a data storage system and/or one or more resources associated with a data storage system to respective candidate data structures. The candidate data structures can be of any suitable type. For instance, a candidate data structure could be a database, a tree, a list or linked list, a table, etc. Other data structures are also possible. Various non-limiting examples of properties that can be utilized by the candidate assignment component 110 are described in further detail below.

System 100 as shown in FIG. 1 further includes a latency estimation component 120 that can estimate respective latencies associated with the respective candidate data structures mapped by the candidate assignment component 110. In an aspect, latencies as estimated by the latency estimation component 120 can be associated with queries of the respective candidate data structures. For instance, the latency estimation component 120 can determine average latencies associated with queries of a given data structure, a maximum latency (e.g., a latency guarantee), and/or other latency-related parameters. Based on the latencies as determined by the latency estimation component 120, a selection component 130 as further illustrated by FIG. 1 can select a candidate data structure of the candidate data structures mapped by the candidate assignment component 110 that has a latency that is less than a threshold latency. In an aspect, the threshold latency can be specified in absolute terms or in relative terms, e.g., such that the selection component 130 selects a candidate data structure having a lowest or near-lowest latency. Other criteria could also be used by the selection component 130 in selecting a candidate data structure.

In an aspect, system 100 as shown by FIG. 1 can be utilized to manage a data structure for the specific, non-limiting example of coordinating locks on resources stored on a data storage system as described below with reference to FIGS. 2-3. It should be appreciated, however, that FIGS. 2-3 and their accompanying description are merely one type of data that can be managed by various embodiments as described herein, and that other types of data can also be managed in a similar manner.

In an aspect, system 100 as shown by FIG. 1 can be implemented by a distributed data storage system, in which individual computing devices (nodes) can be connected to each other in order to provide data storage in a modular and highly scalable manner. In one example, respective computing nodes can be logically and/or physically connected to form clusters or other groups of computing nodes. Respective clusters can, in turn, be connected (e.g., via one or more wired or wireless network technologies) to form the data storage system.

To facilitate seamless operation between respective nodes and/or clusters of the data storage system, the data storage system can utilize a distributed file system, e.g., implemented via a distributed operating system, in which files and/or other resources stored on the system share a single namespace and file system. In an aspect, a distributed operating system associated with a data storage system can implement a locking mechanism in order to lock or otherwise hold certain resources stored on the system as needed by respective clients or other users. For instance, a client user can request a lock on a particular file, block, or other stored resource in order to make edits to that resource without interference from other potentially contending users, thereby preventing inconsistencies to stored resources due to simultaneous edits. As the distributed operating system can run via a single namespace and file system, the system can be configured such that a lock on any resource(s) can be requested via any node or cluster in the system regardless of where the requested resource(s) are stored.

In addition to coordinating locks for whole resources stored on the system, such as disk blocks, files, or the like, a lock can also be held for a portion of a resource, e.g., as designated by a range. For instance, if alterations are to be made to only a portion of a file or other resource, a lock can be held for only the portion of the resource on which the modifications are to be made. As a result, various resources stored by a data storage system can be associated with a large number of lock requests over a large number of ranges, which may or may not intersect.

Figure 2:
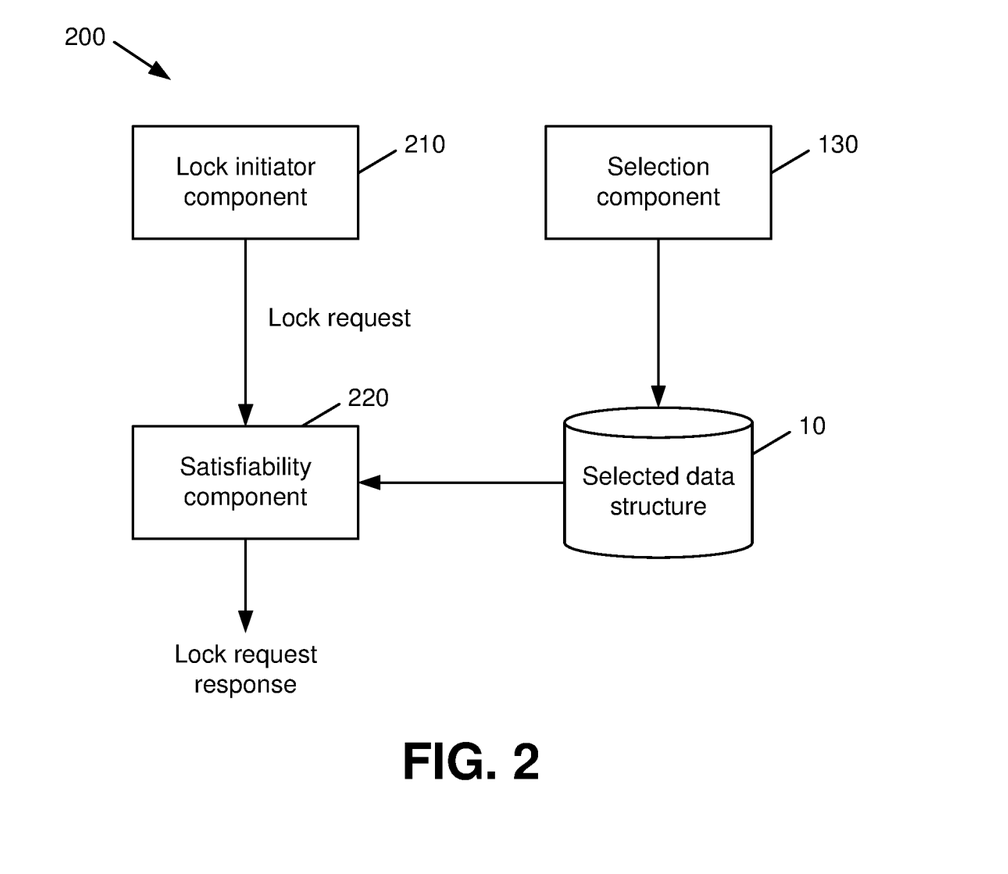
FIG. 2 is a block diagram of a system that facilitates processing a lock request in a data storage system according to a self-optimizing interval detection data structure in accordance with various aspects described herein.
Figure 3:
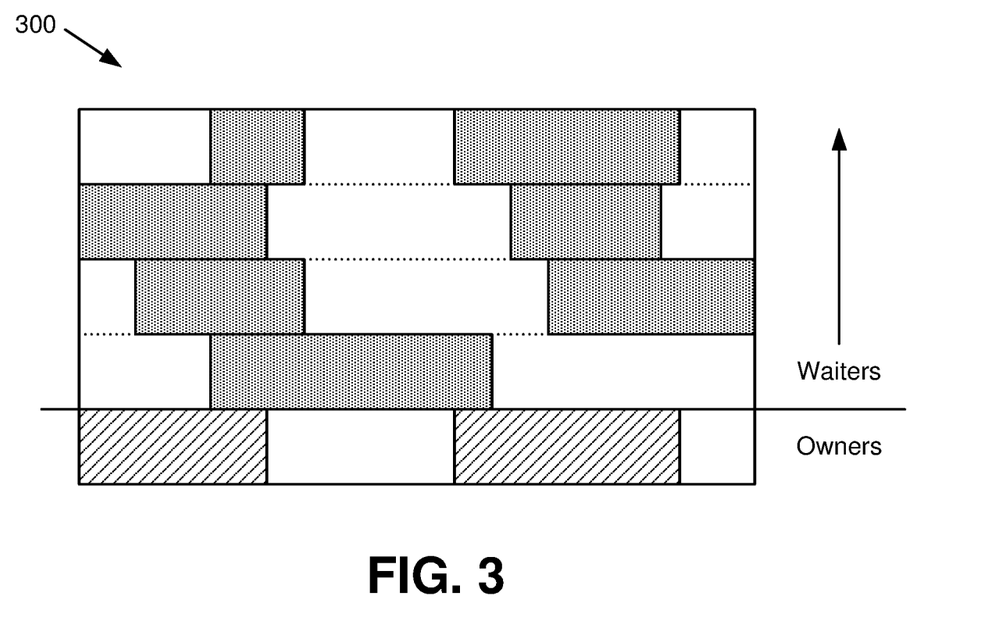
FIG. 3 is a diagram depicting example lock data for a resource associated with a data storage system in accordance with various aspects described herein.

Turning next to FIG. 2, a block diagram of a system that facilitates processing a lock request in a data storage system according to a self-optimizing interval detection data structure in accordance with various aspects described herein is illustrated. Repetitive description of like elements employed in other embodiments described herein is omitted for brevity. As shown in FIG. 2, system 200 can include a lock initiator component that receives a lock request, e.g., for a storage block or other resource or an offset range with reference to the storage block or other resource, from a lock requester. The lock requester can be, for instance, a client computer and/or another entity that can request a hold on modifications to the resource, e.g., to make modifications to the resource and/or for other purposes. System 200 can further include a satisfiability component that can identify conflicts between the lock request and respective lock holders or lock waiters based on the selected data structure 10, e.g., as selected by the selection component 130 as described above with respect to FIG. 1.

In an aspect, the lock initiator component 210 and the satisfiability component 220 can be implemented as part of a distributed lock manager within an associated data storage system. For instance, the lock initiator component can be, or can include the functionality of, a lock initiator module that can run on respective computing nodes and/or clusters of the data storage system to provide a means for requesting locks on resources stored by the system. Additionally, the satisfiability component 220 can be, or can include the functionality of, a lock coordinator module that can run on respective computing nodes and/or clusters of the data storage system to coordinate locks on resources stored on those nodes and/or clusters.

By way of example, if the file system on a given computing node wishes to request a lock on a resource, the file system can request a lock from a lock initiator component 210 resident on that node. The lock initiator component 210 for the node can, in turn, determine the node in the system that coordinates locks for the requested resource, e.g., via a hash function and/or by other suitable means. In response to determining which node in the system coordinates the requested resource, the lock initiator component 210 can then communicate the lock request to the satisfiability component 220 on the coordinating node. The satisfiability component 220 can then determine whether the lock can be granted, e.g., based on the presence or absence of contending lock owners or waiters, locks that can be released, and/or other factors. If the satisfiability component 220 determines that the requested lock can be granted, e.g., by way of absence of contending locks or lock requests, the satisfiability component 220 can grant the requested lock and add the requester as a lock owner for the requested resource. Alternatively, if a lock cannot be granted, the satisfiability component 220 can deny the lock request and/or add the requester as a lock waiter for the requested resource. In an aspect, the satisfiability component 220 can return a response to the lock request to the lock initiator component 210 and/or one or more other components associated with the node on which the lock initiator component 210 is associated. The response can include the status of the request, e.g., whether the request was granted or denied, as well as other suitable information.

In an aspect, the lock initiator component 210 can manage locks for multiple resources, as well as multiple threads of execution that can have locks on different resources. For instance, the lock initiator component 210 can maintain a set of metadata that track which resources have been granted locks and/or for which locks are requested. In addition, some locks can have different contention types. For instance, a shared lock on a resource could enable multiple shared owners of the same lock, while an exclusive lock (also referred to as a mutually exclusive lock or mutex) can be configured to have a single exclusive owner at any given point in time.

In an aspect, the satisfiability component 220 can respond to a lock request for a resource provided by the lock initiator component 210 by first determining whether there exists any current lock owner for the resource that will contend with the request. In the example of a requested exclusive lock, the satisfiability component 220 can deny the lock request if any locks for the resource exist. Alternatively, in the example of a request for a shared (non-exclusive) lock, the satisfiability component 220 can identify the current owners, if any, for the requested resource. Subsequently, the satisfiability component 220 can block and/or otherwise deny the lock request if any of the identified owners hold an exclusive lock or grant the lock otherwise.

If the satisfiability component 220 determines that there are no contending lock owners for a given lock request, the satisfiability component 220 can further determine if other waiters exist who would contend with the new request, e.g., if exclusive waiters are present. If another exclusive waiter is already present, the satisfiability component 220 can block the request. If a lock request is blocked or denied due to the presence of exclusive waiters or owners, the satisfiability component 220 can add the requester as a waiter for the resource.

In an aspect, the selected data structure 10 provided by the selection component 130 can represent a list of owners and waiters for a particular resource or set of resources. In addition, the selected data structure 10 can represent offset ranges associated with various requested or owned locks. A simplified graphical representation of lock owners and waiters for respective ranges of an example resource is shown by diagram 300 in FIG. 3.

As shown in diagram 300, locks can be processed with reference to various offset ranges. To the extent that offset ranges for which locks have been requested do not overlap or otherwise contend with each other, locks can be granted for multiple ranges simultaneously in some instances. For instance, diagram 300 shows an example in which two locks have been granted for different non-overlapping segments of the storage block (e.g., as defined by their respective offset ranges).

As a result of a given resource potentially being associated with a large amount of overlapping and/or non-overlapping ranges, the selected data structure 10 can include metadata on a per-resource basis to enable the tracking of ranges associated with the resource. For instance, the selected data structure 10 can be an interval tree, e.g., a height-balanced interval tree, and/or another suitable data structure that can track ranges for a given resource. Thus, when a lock is requested for a given offset range of a resource, the satisfiability component 220 can determine whether contending locks are currently being held by respective lock owners in any overlapping or intersecting offset ranges. Stated another way, the satisfiability component 220 can determine which existing ranges, e.g., ranges as shown in diagram 300, overlap or intersect with a requested range. Next, for those ranges, a list of owners and/or waiters for those ranges can be consulted to determine if the requested lock can be granted.

To the above ends, it is desirable to structure the selected data structure 10 to reduce overhead associated with checking existing ranges. For instance, if a data structure utilized by the satisfiability component 220 is not structured on the basis of ranges, the satisfiability component 220 can be configured to traverse all owners and waiters in the data structure regardless of whether ranges associated with those owners and waiters overlap or intersect a requested range. As a single resource can potentially have hundreds of waiters and owners that can respectively be associated with hundreds of different ranges, this can potentially result in long delays.

Returning to FIG. 1, the candidate assignment component 110 can map properties of a storage block or other resource, such as respective offset ranges with reference to a storage block, identities of respective lock holders for the respective offset ranges, identities of respective waiters for the respective offset ranges, etc. Based on these candidate data structures, as well as respectively corresponding latencies as determined by the latency estimation component 120, the selection component 130 can select from the multiple candidate data structures to obtain a selected data structure 10 that has a latency below a threshold for a current state of a corresponding resource. The threshold can be an absolute threshold or a relative threshold, e.g., the selection component 130 can select a candidate data structure having a lowest or near-lowest latency for a current resource configuration.

In an aspect, the candidate data structures provided to the selection component 130 can be similar in structure (e.g., the candidate data structures can be tables, interval trees, etc.), or different candidate data structures can have different structures. Also or alternatively, different candidate data structures provided to the selection component 130 can vary in terms of indexing. For instance, a first candidate data structure can be indexed such that owners, waiters, and ranges utilize a common index. This can be used, for example, in a scenario in which the corresponding resource has a small number of ranges and/or a large number of non-overlapping ranges. Alternatively, a second candidate data structure can be indexed such that ranges within the resource have their corresponding waiters and owners. Such a data structure can be utilized, for example, in a scenario in which a resource has a large amount of overlapping ranges. In such a case, respective ranges intersecting a requested range can be identified within the data structure to facilitate traversal of waiters and owners in the affected ranges only. Data structure indexing in this manner for an appropriate resource can in some cases lower the complexity of traversing relevant waiters, owners, and ranges from $O(n^2)$ as described above to $O(\log n)$. Other methods for assigning system properties to candidate data structures could also be used.

In general, the selection component 130 can select an appropriate data structure that has a suitable latency for the current resource state (e.g., which can be expressed in terms of the number of owners, waiters, and ranges). This can be transformed into finding a function F that maps the resource state to a particular data structure having a sufficiently fast runtime and/or latency for that resource state.

In an aspect, the selection component 130 can obtain the selected data structure 10 via one or more supervised pattern recognition algorithms. The selection component 130 can select as features the number of waiters, number of owners, number of ranges, maximum desired depth for an interval tree and/or other parameters particular to the type of data structure being considered, properties relating to number of waiters per range (e.g., minimum, maximum, and/or average number of waiters per range), properties relating to number of owners per range (e.g., minimum, maximum, and/or average number of owners per range), and/or any other suitable properties.

In another aspect, the selection component 130 can obtain the selected data structure 10 based on one or more machine learning algorithms. To this end, the selection component 130, and/or one or more other components, can generate a training set by generating respective resource states having different numbers of ranges, different numbers of waiters and/or owners, and/or other parameters. For respective ones of the resource states in the training set, respective candidate data structures can be simulated and/or otherwise analyzed to determine which candidate data structure provides a lowest latency for a given resource state. For instance, a set of deterministic and/or fuzzy lock load can be generated to explore the sample space of the feature set. Common workload benchmarks, performance benchmarks, longevity tests, and/or other criteria can be also used to generate a feature set sample space. Once enumerated, the sample space can be then executed with respective versions of a data structure, and a version with a sufficiently low latency, e.g., a lowest or best latency, can be assigned as the label for each feature vector. This can be then refined and used for making classifications at runtime. Other techniques for generating a training set can also be used.

Based on the generated training set, the selection component 130 can then identify a selected data structure 10 among a set of candidate data structures via one or more pattern recognition techniques. By way of non-limiting example, the selection component can use a k nearest neighbor (kNN) classification algorithm to approximate a function F corresponding to the selected data structure 10 by classifying the current instance of the resource state based on its k nearest neighbors in the training set. Euclidian distance and/or other suitable distance metrics can be used. Other techniques for identifying a selected data structure 10 are also possible.

Figure 4:
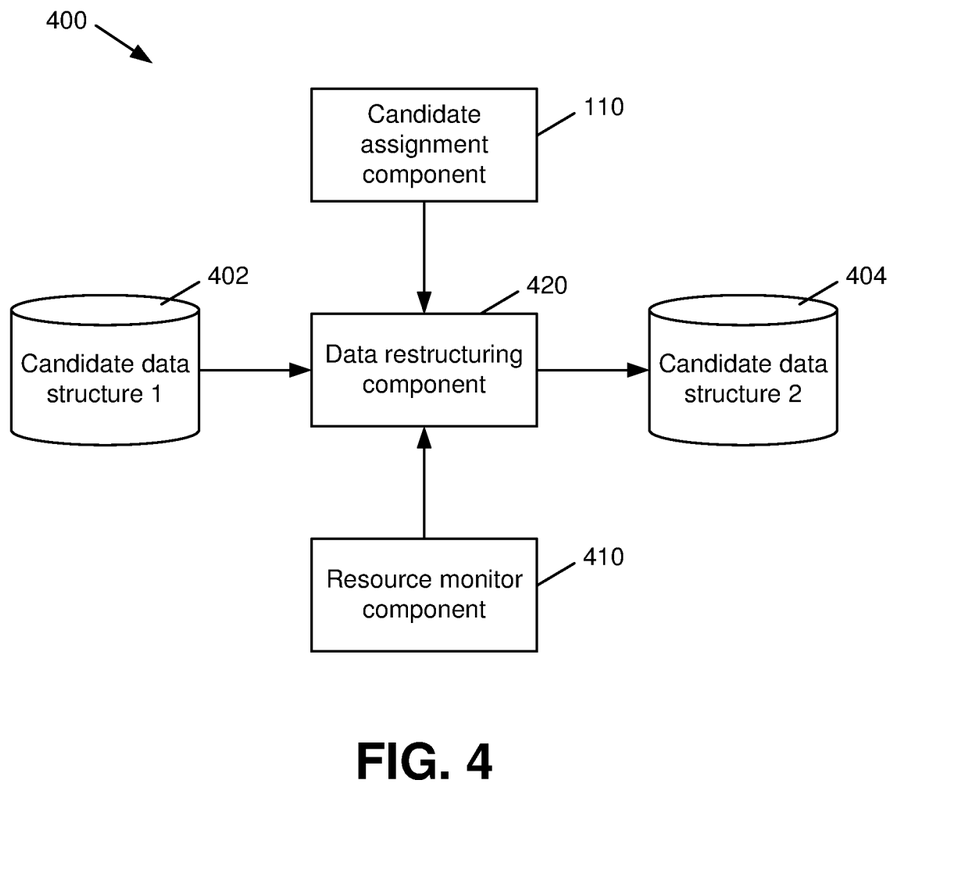
FIG. 4 is a block diagram of a system that facilitates updating a self-optimizing interval detection data structure in accordance with various aspects described herein.

With reference next to FIG. 4, a system 400 that facilitates updating a self-optimizing interval detection data structure in accordance with various aspects described herein is illustrated. Repetitive description of like elements employed in other embodiments described herein is omitted for brevity. As shown in FIG. 4, system 400 includes a candidate assignment component 110 that can map properties of a resource, e.g., a disk or storage block of a file system and/or another suitable resource, to respective candidate data structures. System 400 further includes a resource monitor component 410 that can track changes to the properties of the resource and a data restructuring component 420 that can, based on the changes to the properties of the resource as tracked by the resource monitor component 410, initiate a migration of the selected data structure (e.g., the selected data structure 10 as determined by the selection component 130 as described above) from a first candidate data structure 402 to a second candidate data structure 404 that is different from the first candidate data structure 402.

In an aspect, a default data structure can be utilized as a starting case, e.g., for the first candidate data structure 402. Alternatively, an initial data structure can be selected by any suitable means. Based on changes to the resource as observed by the resource monitor component 410, such as changes to the ranges, waiters, owners, and/or other properties of the resource, the data restructuring component 420 can initiate restructuring of the resource properties into the second candidate data structure 404 as appropriate. In one example, the data restructuring component 420 can initiate a migration from the first candidate data structure 402 to the second candidate data structure 404 based on the second candidate data structure 404 having a latency that is lower than a latency associated with the first candidate data structure 402 by at least a threshold difference for a current state of the resource. This can be done, for example, to reduce overhead associated with excessive switching.

Figure 5:
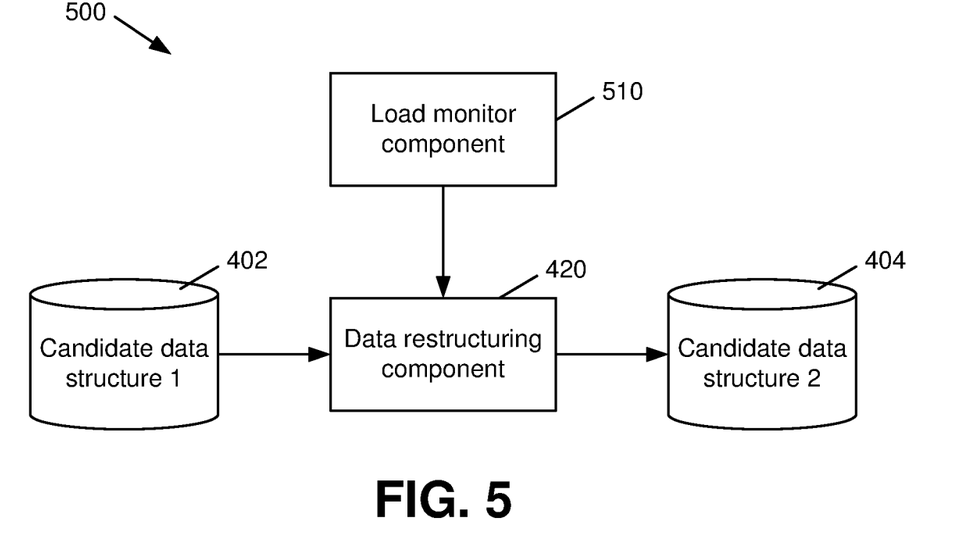
FIG. 5 is a block diagram of a system that facilitates updating a self-optimizing interval detection data structure based on observed system load in accordance with various aspects described herein.

In addition, as shown by system 500 in FIG. 5, the data restructuring component 420 can further be associated with a load monitor component 510 that can monitor a system load level of the associated data storage system. This can enable the data restructuring component 420 to optimize an associated data structure (e.g., by switching from the first candidate data structure 402 to the second candidate data structure 404) in the background under conditions of low load, e.g., in response to the system load level being lower than a load threshold. By restricting restructuring of the data structure to times of low load as determined by the load monitor component 510, migration of the data structure and its associated operations, such as traversing the respective ranges represented in the data structure to collect relevant data for migration, can be performed with minimal impact on the overall performance of the system.

In an aspect, the load monitor component 510 can utilize heuristics to determine low-load periods and/or other times for which data restructuring is appropriate. Also or alternatively, the data restructuring component can utilize reinforcement learning to determine appropriate times for data restructuring. For instance, as shown by system 600 in FIG. 6, the data restructuring component 420 can communicate with a reinforcement learning component 610 that can instruct the data restructuring component 420 to initiate migration from the first candidate data structure 402 to the second candidate data structure 404 based on a reward function. The reward function can be based on factors that can include, but are not limited to, latencies associated with the first candidate data structure 402 and the second candidate data structure 404, a computational cost associated with migrating the data structure, etc.

Figure 6:
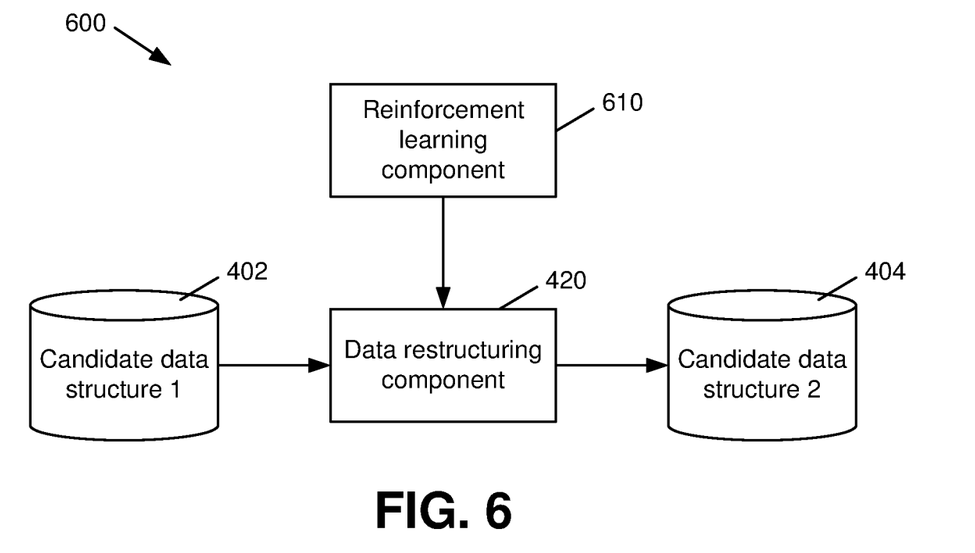
FIG. 6 is a block diagram of a system that facilitates updating a self-optimizing interval detection data structure via reinforcement learning in accordance with various aspects described herein.

In an aspect, the reinforcement learning component 610 can be employed to find a switch function that incurs minimal computational load on the system. The actions associated with the switch function can include switching or not switching at a given time, and the reward function can be configured to reward correct classification with no throughput degradation. Various processes can be used to model the switch function, such as a Markov decision process (MDP) and/or any other suitable technique(s).

Figure 7:
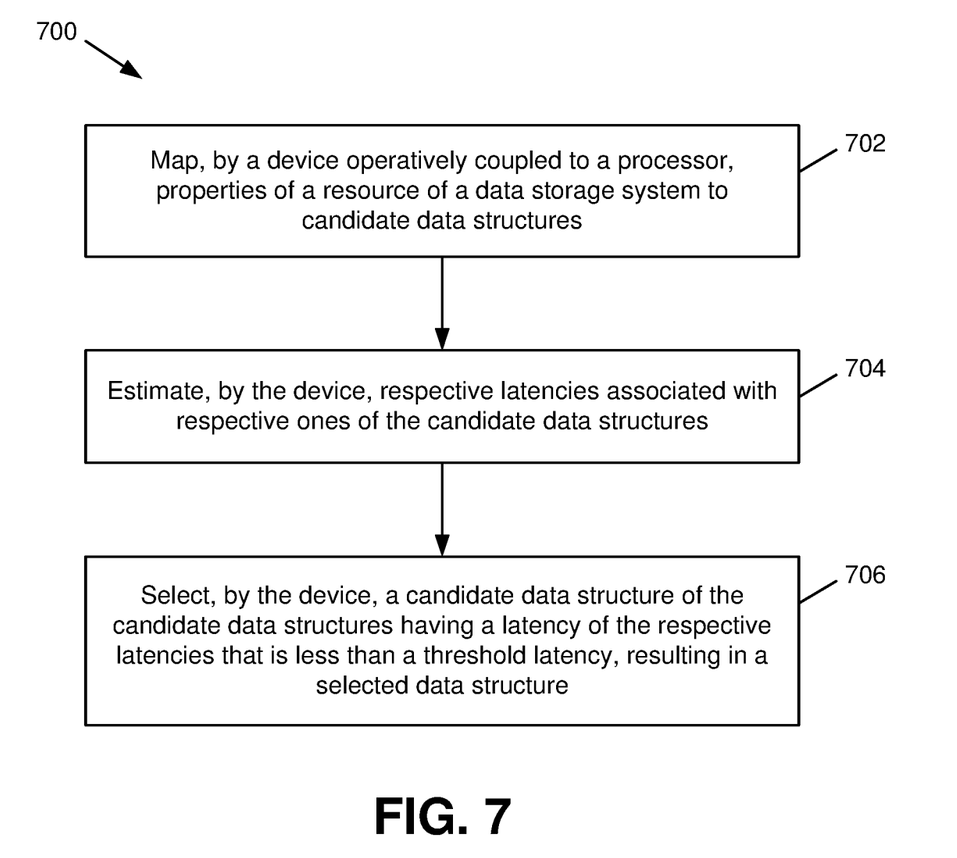
FIG. 7 is a flow diagram of a method that facilitates initializing a self-optimizing interval detection data structure in accordance with various aspects described herein.

With reference now to FIG. 7, presented is a flow diagram of a method 700 that facilitates initializing a self-optimizing interval detection data structure in accordance with various aspects described herein. At 702, a device operatively coupled to a processor can map (e.g., via a candidate assignment component 110) properties of a resource of a data storage system to candidate data structures.

At 704, the device can estimate (e.g., via a latency estimation component 120) respective latencies associated with respective ones of the candidate data structures mapped at 702.

At 706, the device can select (e.g., by a selection component 130) a candidate data structure of the candidate data structures mapped at 702 having a latency of the respective latencies estimated at 704 that is less than a threshold latency, resulting in a selected data structure (e.g., a selected data structure 10).

Figure 8:
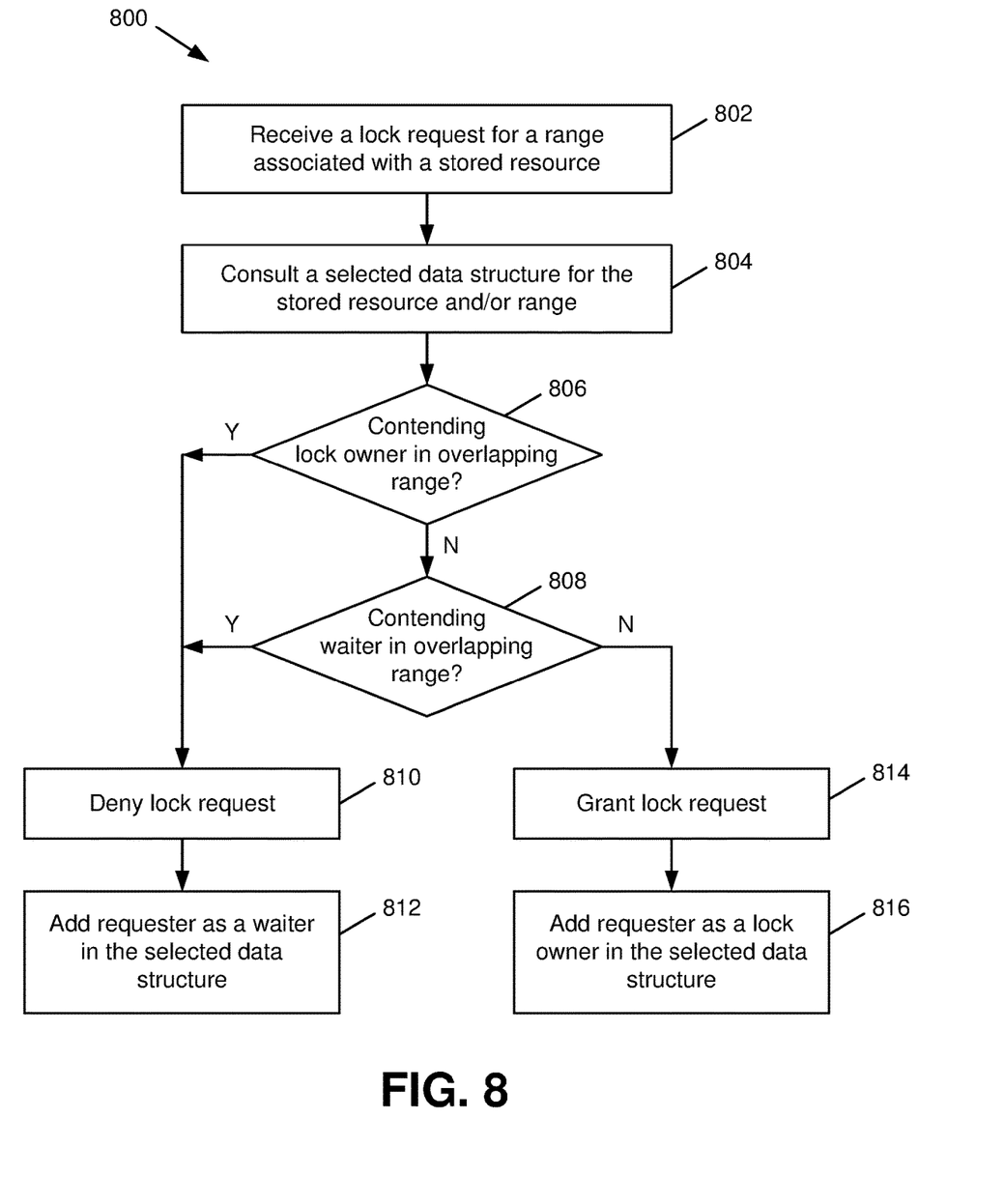
FIG. 8 is a flow diagram of a method that facilitates processing a lock request in a data storage system according to a self-optimizing interval detection data structure in accordance with various aspects described herein.

Turning now to FIG. 8, illustrated is a flow diagram of a method 800 that facilitates processing a lock request in a data storage system according to a self-optimizing interval detection data structure in accordance with various aspects described herein. At 802, a lock request can be received (e.g., by a lock initiator component 210) for a range associated with a stored resource.

At 804, a selected data structure (e.g., a selected data structure 10) for the stored resource and/or range can be consulted (e.g., by a satisfiability component 220). In an aspect, 802 and 804 can be performed via different computing nodes in a data storage system. For example, a lock request can be received at 802 via a first computing node, and the first computing node can direct the request to another computing node that is responsible for the requested resource(s) and/or range(s) at 804.

Next, at 806, the data structure is used to determine (e.g., by the satisfiability component 220) whether a contending lock owner in an overlapping range to the requested range is present. If no contending lock owner is found, method 800 continues to 808, in which the data structure is further used to determine (e.g., by the satisfiability component 220) whether a contending waiter in an overlapping range to the requested range is present.

If a contending lock owner or waiter is found at 806 or 808, respectively, method 800 proceeds to 810 to block and/or otherwise deny the lock request received at 802. Subsequently, the requester can optionally be added as a waiter for the corresponding range in the selected data structure at 812.

If, instead, no contending lock owners or waiters are found at 806 or 808, method 800 can proceed to 814 to grant the lock request received at 802. Upon granting the lock request, the requester can be added as a lock owner in the selected data structure at 816.

Figure 9:
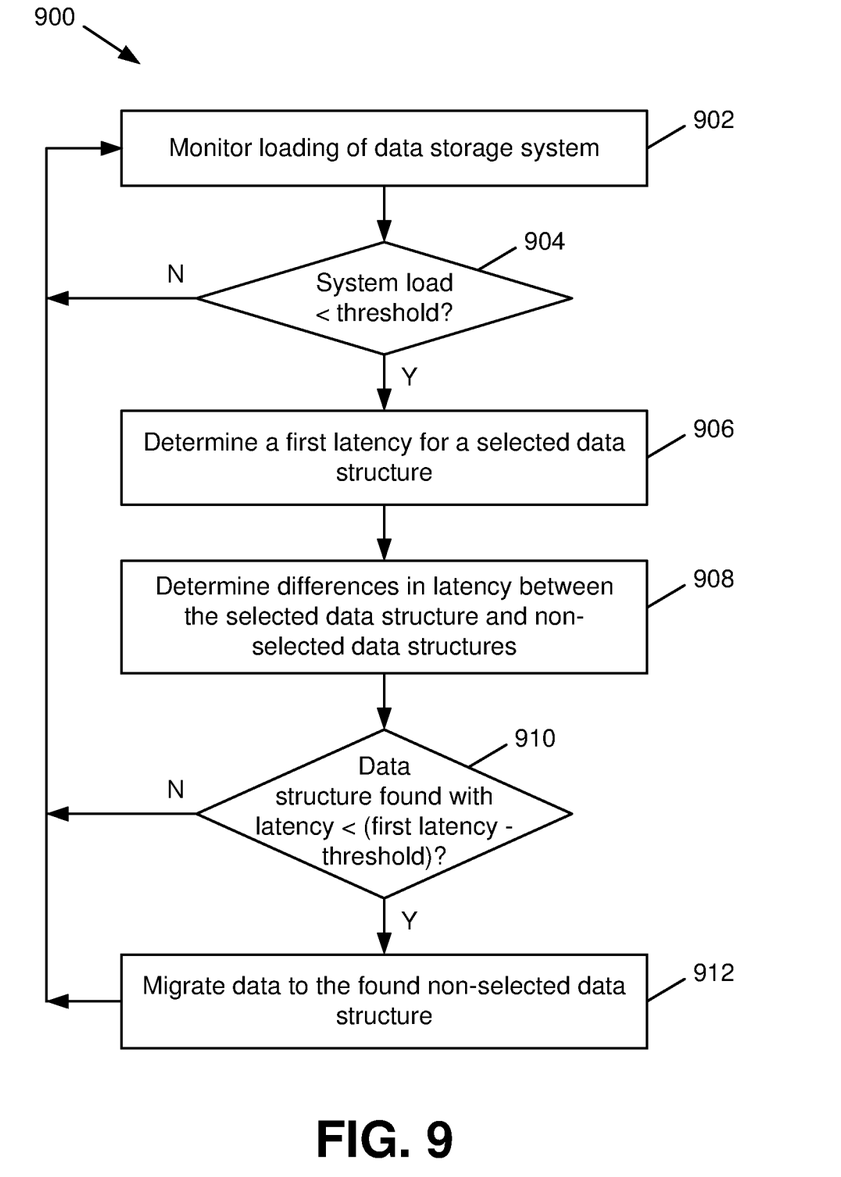
FIG. 9 is a flow diagram of a method that updating a self-optimizing interval detection data structure in accordance with various aspects described herein.

With reference next to FIG. 9, presented is a flow diagram of a method 900 that updating a self-optimizing interval detection data structure in accordance with various aspects described herein. At 902, loading of a data storage system can be monitored (e.g., by a load monitor component 510). At 904, it is determined whether the current system load is lower than a threshold. If the system load is not lower than the threshold, method 900 returns to 902 for further load monitoring. Otherwise, method 900 proceeds to 906.

At 906, a first latency for a currently selected data structure (e.g., a first candidate data structure 402) can be determined (e.g., by a data restructuring component 420 and/or a latency estimation component 120).

At 908, differences in latency between the selected data structure used at 906 and respective non-selected data structures (e.g., data structures including a second candidate data structure 404) can additionally be determined (e.g., by the data restructuring component 420 and/or the latency estimation component 120).

At 910, if a data structure is found at 908 that has a latency of less than the first latency determined at 906 minus a threshold, i.e., if a data structure is found at 908 having a latency that is lower than the first latency by at least a threshold difference, data of the selected data structure can be migrated to that data structure (e.g., by the data restructuring component 420) at 912. Subsequent to the migration at 912, or if no such data structure is found at 910, method 900 can return to 902 for further operation.

FIGS. 7-9 as described above illustrate respective methods in accordance with certain aspects of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 10:
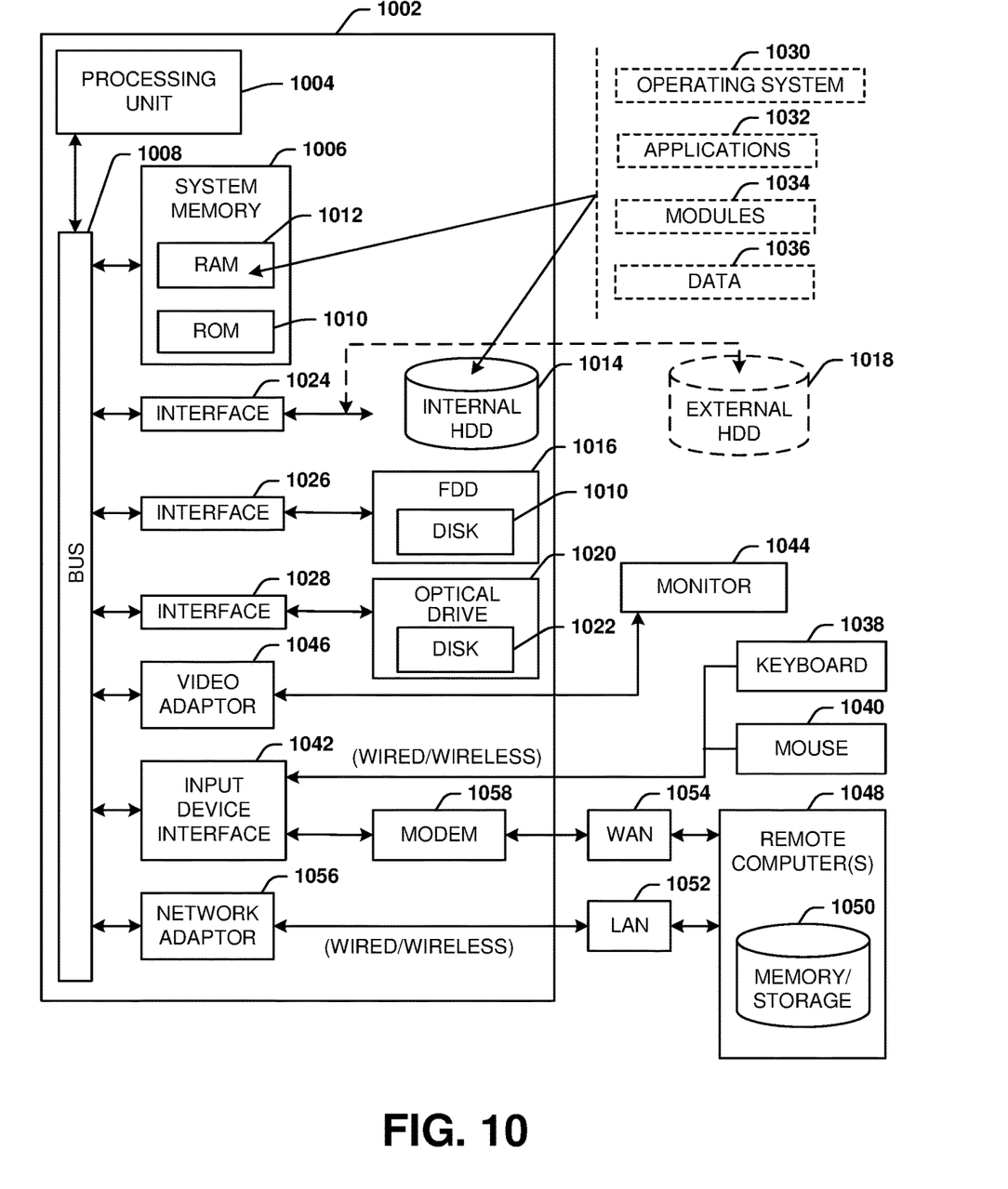
FIG. 10 is a diagram of an example computing environment in which various embodiments described herein can function.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD-ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). While the internal HDD 1014 is illustrated as located within the computer 1002, the internal HDD 1014 can also be configured for external use in a suitable chassis (not shown).

The HDD 1014, magnetic FDD 1016 and optical disk drive 1020 can be connected to the system bus 1008 by an HDD interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a USB port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless access point (AP) disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
    a memory that stores computer executable components; and
    a processor that executes computer executable components stored in the memory, wherein the computer executable components comprise:
        a candidate assignment component that maps properties, stored by an initial data structure, of a resource of the data storage system to respective candidate data structures, wherein the respective candidate data structures are of a same structure type, and wherein the respective candidate data structures utilize respective mutually distinct indexing schemes;
        a latency estimation component that estimates respective latencies associated with the respective candidate data structures; and
        a selection component that initiates storage of the properties of the resource in a selected candidate data structure, of the respective candidate data structures, in response to the selected candidate data structure having a first latency that is less than a threshold latency associated with the initial data structure.

2. The data storage system of claim 1, wherein the resource comprises a storage block associated with a file system of the data storage system.

3. The data storage system of claim 2, wherein the properties of the resource comprise respective offset ranges with reference to the storage block, first identities of respective lock holders for the respective offset ranges, and second identities of respective lock waiters for the respective offset ranges.

4. The data storage system of claim 1, wherein the selected candidate data structure is a first selected candidate data structure, and wherein the computer executable components further comprise:
    a resource monitor component that tracks changes to the properties of the resource; and
    a data restructuring component that initiates, based on the changes to the properties of the resource, a migration of the properties of the resource from the first selected candidate data structure to a second selected candidate data structure, of the candidate data structures, that is different from the first selected candidate data structure.

5. The data storage system of claim 4, wherein the data restructuring component initiates the migration based on the second selected candidate data structure having a second latency that is lower than the first latency by at least a threshold difference, the threshold difference being proportional to a computational cost associated with the migration.

6. The data storage system of claim 5, wherein the computer executable components further comprise:
    a reinforcement learning component that instructs the data restructuring component to initiate the migration based on a reward function, the reward function being based on the first latency, the second latency, and the computational cost associated with the migration.

7. The data storage system of claim 4, wherein the computer executable components further comprise:
    a load monitor component that monitors a system load level of the data storage system, wherein the data restructuring component initiates the migration in response to the system load level being lower than a load threshold.

8. The data storage system of claim 3, wherein the candidate data structures comprise a first candidate data structure associated with a first indexing scheme that utilizes a common index for the respective offset ranges with reference to the storage block, the lock holders for the respective offset ranges, and the lock waiters for the respective offset ranges, and a second candidate data structure that utilizes a second indexing scheme that indexes the second candidate structure exclusively by the respective offset ranges with reference to the storage block.

9. The data storage system of claim 3, wherein the latency estimation component estimates the respective latency as a function of the properties of the resource, the function of the properties of the resource utilizing features comprising a first number of the offset ranges with reference to the storage block, a second number of the lock owners for the offset ranges, and a third number of the lock waiters for the offset ranges.

10. A method, comprising:
    mapping, by a device operatively coupled to a processor, properties of a resource of a data storage system, as stored by an initial data structure, to candidate data structures, wherein the candidate data structures are of a same structure type, and wherein the candidate data structures utilize respective mutually distinct indexing schemes;

estimating, by the device, respective latencies associated with respective ones of the candidate data structures; and initiating, by the device, storage of the properties of the resource in a first selected candidate data structure, of the candidate data structures, having a first latency of the respective latencies that is less than a threshold latency associated with the initial data structure.

11. The method of claim 10, wherein the resource comprises a storage block associated with a file system of the data storage system, and wherein the properties of the resource comprise respective offset ranges with reference to the storage block, first identities of respective lock holders for the respective offset ranges, and second identities of respective lock waiters for the respective offset ranges.

12. The method of claim 10, wherein the selected candidate data structure is a first selected candidate data structure, and wherein the method further comprises:

tracking, by the device, changes to the properties of the resource; and based on the changes to the properties of the resource, initiating, by the device, a migration of the properties of the resource from the first selected candidate data structure to a second selected candidate data structure, of the candidate data structures, that is different from the first selected candidate data structure.

13. The method of claim 12, wherein the initiating comprises initiating the migration based on the second selected candidate data structure having a second latency that is lower than the first latency by at least a threshold difference, the threshold difference being proportional to a computational cost associated with the migration.

14. The method of claim 12, further comprising:

monitoring, by the device, a system load level of the data storage system, wherein the initiating comprises initiating the migration in response to the system load level being lower than a load threshold.

15. The method of claim 11, wherein the candidate data structures comprise a first candidate data structure associated with a first indexing scheme that utilizes a common index for the respective offset ranges with reference to the storage block, the lock holders for the respective offset ranges, and the lock waiters for the respective offset ranges, and a second candidate data structure associated with a second indexing scheme in which the second candidate data structure is indexed exclusively by the respective offset ranges with reference to the storage block.

16. A non-transitory machine-readable medium comprising computer executable instructions that, when executed by a processor of a data storage system, facilitate performance of operations, the operations comprising:

mapping properties of a resource of the data storage system to a plurality of candidate data structures, wherein each of the plurality of candidate data structures are of a same structure type, and wherein respective ones of the plurality of candidate data structures utilize respective mutually distinct indexing schemes;

estimating respective latencies associated with respective ones of the plurality of candidate data structures; and initiating a first migration of the properties of the resource from an initial data structure to a selected candidate data structure of the plurality of candidate data structures, having a latency, of the respective latencies, that is less than a threshold latency associated with the initial data structure.

17. The non-transitory machine-readable medium of claim 16, wherein the resource comprises a storage block associated with a file system of the data storage system, and wherein the properties of the resource comprise respective offset ranges with reference to the storage block, first identities of respective lock holders for the respective offset ranges, and second identities of respective lock waiters for the respective offset ranges.

18. The non-transitory machine-readable medium of claim 16, wherein the selected candidate data structure is a first selected candidate data structure, and wherein the operations further comprise:

tracking changes to the properties of the resource; and based on the changes to the properties of the resource, initiating a second migration of the properties of the resource from the first selected candidate data structure to a second selected candidate data structure, of the plurality of candidate data structures, that is different from the first selected candidate data structure.

19. The non-transitory machine-readable medium of claim 18, wherein the latency is a first latency, and wherein the operations further comprise:

initiating the migration based on the second selected candidate data structure having a second latency that is lower than the first latency by at least a threshold difference that is associated with a computational cost of the migration.

20. The non-transitory machine-readable medium of claim 18, wherein the operations further comprise:

monitoring a system load level of the data storage system; and initiating the migration in response to the system load level being lower than a load threshold.

* * * * *